US006785191B2

(12) United States Patent
Chambers

(10) Patent No.: US 6,785,191 B2
(45) Date of Patent: Aug. 31, 2004

(54) ROBUST POWER-ON METER AND METHOD USING A LIMITED-WRITE MEMORY

(75) Inventor: Peter Chambers, Phoenix, AZ (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 10/340,439

(22) Filed: Jan. 9, 2003

(65) Prior Publication Data

US 2004/0136273 A1 Jul. 15, 2004

(51) Int. Cl.[7] .......................... G04F 10/00; G06F 16/20

(52) U.S. Cl. ............................. 368/8; 368/10; 368/113; 377/20; 702/178

(58) Field of Search ....................... 368/5–10, 110–113; 377/15, 20; 702/77, 177–179

(56) References Cited

U.S. PATENT DOCUMENTS 4,584,647 A 4/1986 Eckert ........................ 364/464
4,617,639 A 10/1986 Paine ........................ 364/569
4,710,888 A * 12/1987 Burke et al. ................ 702/165
4,803,707 A * 2/1989 Cordan, Jr. ................ 377/24.1
4,860,228 A * 8/1989 Carroll .................. 365/185.09
5,892,735 A 4/1999 Tsuda et al. ................ 368/113

* cited by examiner

*Primary Examiner*—Vit W. Miska
(74) *Attorney, Agent, or Firm*—Bever, Hoffman & Harms, LLP; James E. Parsons

(57) ABSTRACT

A data word is used to represent the total amount of time duration or predefined events a device has experienced during its lifetime. The data word is incremented count by count while the device is powered on and each updated data word is backed up to a non-volatile memory. A two-version redundancy scheme is employed to ensure failsafe backup and restoration of the data word. At any time at least one valid version of the data word exists in the non-volatile memory. In another aspect, a partitioned memory configuration is implemented to backup the data word and its associated error correction code to the non-volatile memory. In this way the non-volatile memory is able to store a range of counts whose maximum number far exceeds the memory's endurance limit.

13 Claims, 8 Drawing Sheets

ROBUST POWER-ON METER AND METHOD USING A LIMITED-WRITE MEMORY

FIELD OF THE INVENTION

This invention relates generally to an apparatus and method for metering the total amount of time or events a device has experienced during its lifetime, and more particularly for implementing them in failsafe manner using a non-volatile memory that supports a limited number of writes.

BACKGROUND OF THE INVENTION

Meters that measure usage are useful for gauging the aging of a device or equipment in question. With the logging of the amount of usage, the device could be scheduled for maintenance or replacement in order to maximize reliability and longevity over its useful life.

For electrical or electronic devices, these meters assume the form of a "power-on" meter. Either time or some predefined events are logged while the device is powered on. For example, it is useful for an integrated circuit chip to be able to provide to the user the number of accumulated hours it has been powered on throughout its lifetime. This number must persist through power cycles and must be stored in a non-volatile memory that retains its data even if the power is turned off.

Typically, the non-volatile memory is an EEPROM or a flash EEPROM, which can be electrically writable and erasable by altering the charges stored in the floating gate of each memory cell. However, such a memory has a limited lifetime due to the endurance-related stress it suffers each time it goes through an erase/program cycle. The endurance refers to the memory's tolerance for a given number of erase/program cycles. Whenever electrons are moved in or out of the floating gate during program or erase, some get trapped in the surrounding dielectric layers. The trapped electrons modify the field effect of the memory transistor. In commercially available EEPROMs, the errors due to electron trappings become so severe that some memory becomes unreliable after undergoing $10^4$ to $10^6$ erase/program cycles.

Another problem in implementing a power-on meter with a non-volatile memory has to do with the reliability and robustness of the data being saved. The program or erase operation of an EEPROM requires a finite amount of time to complete. These operations could be interrupted when power is turned off or interrupted suddenly, resulting in corrupted or incomplete data being saved to the memory. The power interruptions could be caused by the user or by unexpected power failure or power surges in the supply.

A number of prior art solutions have been implemented to address the endurance and robustness problems when storing the data into a non-volatile memory such as EEPROM.

U.S. Pat. No. 4,617,639 discloses an hour meter for an industrial vehicle in which a non-volatile memory is used to store data reflecting elapsed time. Bit changes in the non-volatile memory are minimized by utilizing a gray coded binary representation of a portion of the data and by systematically altering the addressed memory location of a portion of the data in response to one of the stored data values. A 32-bit word is partitioned into groups of 4, 4, 8, 8, 8 bits, respectively for representing a multiple of 1000-hour, of 100-hour, of 10-hour, of 1-hour and of 1/16-hour time intervals. To minimize the number of writes to the non-volatile memory, the last three 8-bit groups are stored as 8-bit gray codes. The gray code has the advantage of changing state only twice during a complete counting cycle from zero through 15 and back to zero again. Furthermore, the 1-hour and the 1/16-hour gray codes are also stored in a different location with each incremental change in the 10-hour time interval. In this way, the number of writes to any memory location is minimized. As for robustness, in the event the battery is disconnected, a capacitor bank in the device provides sufficient residual power to allow the data to be saved back into the non-volatile memory.

U.S. Pat. No. 4,584,647 discloses an electronic postage meter implemented as a ring counter in a non-volatile memory. The ring counter is incremented sequentially at each count and a specific location in the memory is erased and then written with the next number in the sequence. The counter is then stepped to a successive location where the cycle is repeated. In this way all locations suffer about the same number of writes. The ring counter is advantageous in that the redundancy of the numbers stored in the locations of the ring counter makes it relatively easy to determine the exact value stored in the counter. Even in the worst-case failure, it is still possible to reconstruct the counter reading to a value within a few counts of the actual.

U.S. Pat. No. 4,710,888 discloses an electronic odometer in which the sequential odometer values are stored in eight cyclic locations of a non-volatile memory. Each time the vehicle is turned on, data from all the cyclic locations are read and validated by their parity. Then the most recently stored and validated data value is determined and used for display and subsequent measured distance accumulation.

U.S. Pat. No. 5,892,735 discloses a power-on apparatus for an electronic device such as a video CRT display. To ensure robustness of the accumulated data in the event of a power surge or failure or electric shock, three redundant copies of the data are sequentially stored in a non-volatile memory. Each time the apparatus is turned on, the correct value is determined by selecting one that is most closely repeated in the majority of the three copies. If there is an odd one among the three copies, it can be corrected with the value of the majority.

The various prior art solutions described above deal with the robustness problem by one of three ways. In the first way, a small reservoir of power allows the data to be saved into the non-volatile memory in the event of a power failure. However, this method cannot recover from a corruption due to power surge or a defect location in the non-volatile memory. In the second way, a limited history of past saves is maintained in the non-volatile memory. If the last save is corrupted one can always go back to an earlier, albeit less accurate version. In the third way, three copies of each data are saved each time to provide redundancy. However, this method is slow and wasteful and still is not failsafe in the event of power surges.

SUMMARY OF INVENTION

According to one aspect of the invention, a fail-safe memory backup scheme is implemented so that data is always preserved under any power interruption situation. A data word representing a count of power-on durations or events is incremented count by count during the power-on of a device. After each increment, the data word is backed up to a non-volatile memory that is able to retain its memory even after power is turned off. When power is restored to the device after an interruption, the backed up data word is retrieved from the non-volatile memory to continue the increment process. To forestall the data becoming corrupted due to power interruption in the middle of a backup, the invention calls for a two-version redundancy scheme in which at least one valid version of the data word always exists in the non-volatile memory.

Essentially, two versions of the data word and its associated error correction code ("ECC") are maintained in the non-volatile memory. When retrieving the data word from the non-volatile memory, the two versions are checked for validity against their associated ECCs. There are two possibilities: one is when both versions are valid and the other is when one version is valid and one version is corrupted. Generally, a valid version with the largest count is selected for restoration. In other words, if both versions are valid, the one that carries the higher count will be selected. If only one version is valid, it will be selected. When the incremented data word is backed up to the non-volatile memory, it will replace the version there that was not last selected. In this way, even if the back up proves unsuccessful it will not overwrite a valid version. Thus, there will always be a valid version of the data word preserved in the non-volatile memory.

According to another aspect of the invention, a robust power-on meter is implemented with a limited write memory by a partitioned memory configuration and operation with respect to the data word and its error correction code. As described earlier, non-volatile memories such as low cost flash EEPROM typically have an endurance of about 10000 writes per memory location. If the data word is backed up to the non-volatile memory after each count increment, the total count will be limited by the endurance limit of the given non-volatile memory. The present scheme allows a robust power-on meter to be implemented where the total number of counts far exceeds the endurance limit of the non-volatile memory.

Essentially, the data word used to represent a given range of counts is partitioned into a least significant ("LS") subword and a most significant ("MS") subword. The LS subword is such that a full cycling of all its bit combinations will not exceed the endurance limit of the non-volatile memory. In this way, a full cycle of counts as represented by the LS subword will be able to be stored in a same memory location count by count. The MS subword is such that a full cycling of all its bit combinations is able to be stored in a same memory location without exceeding the endurance limit of the non-volatile memory. In this way, a full cycle of most significant counts will not exceed the endurance limit of the non-volatile memory. The invention furthers calls for storing the associated ECC in the same manner as, and in correspondence with, the LS subword, since every increment in the data word requires a backup and therefore an associated ECC. Furthermore, every new cycle of the LS subword and the corresponding ECC will be stored in a different memory location. The different memory location has an address dependent on the value of the MS subword. In this way, every time a bit changes in the MS subword, the next cycling of the LS subword and the corresponding ECC are stored in a different location in the non-volatile memory. Thus, the non-volatile memory is able to store a range of counts whose maximum number far exceeds the endurance limit.

In the preferred embodiment, the power-on meter and method support two versions of the LS subword, two versions of the MS subword and two versions of the associated ECC.

Additional features and advantages of the present invention will be understood from the following description of its preferred embodiments, which description should be taken in conjunction with the accompanying drawings.

DETAILED DESCRIPTION OF THE PREFERRED EMBODIMENTS

Figure 1A:
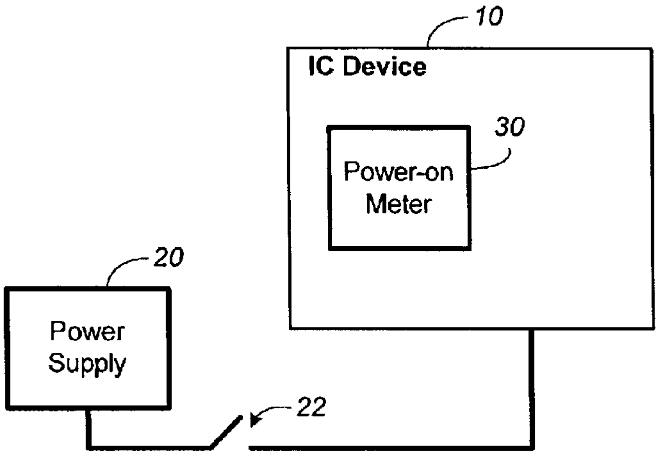
FIG. 1A illustrates a typical application in which the inventive power-on meter is embedded in an integrated circuit device to log its power-on periods or predefined events.

FIG. 1A illustrates a typical application in which the inventive power-on meter is embedded in an integrated circuit device to log its power-on periods or predefined events. An integrated circuit ("IC") device chip 10 is powered by a power supply 20. Power to the IC device 10 may be turned off by a user via a switch 22 or may be disrupted due to power surge or power failure. A power-on meter 30 is integrated into the IC device chip to log the time periods or predefined events when the IC device is powered on.

Figure 1B:
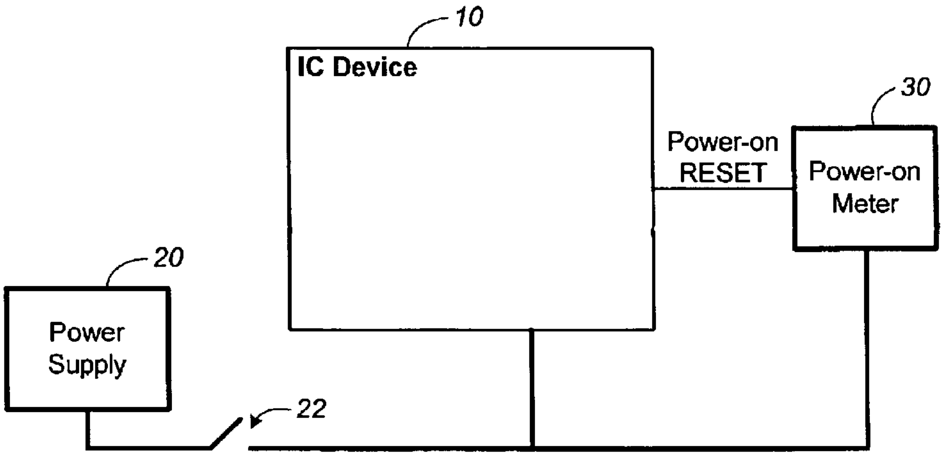
FIG. 1B illustrates another configuration in which the inventive power-on meter is used to log the power-on periods or predefined events of an integrated circuit device.

FIG. 1B illustrates another configuration in which the inventive power-on meter is used to log the power-on periods or predefined events of an integrated circuit device. In this configuration, the power-on meter 30 is not integrated into the IC device chip 10. It is a separate module in communication with the IC device chip for logging the power-on time periods or predefined events. Whenever the IC Device is turned on after a powering down, a Power-on Reset signal is sent from the IC Device 10 to notify the power-on meter 30 of such an event. In other embodiments (not shown), the power-on meter 30 may not be drawing on the same power supply 20 as the IC device.

Figure 2:
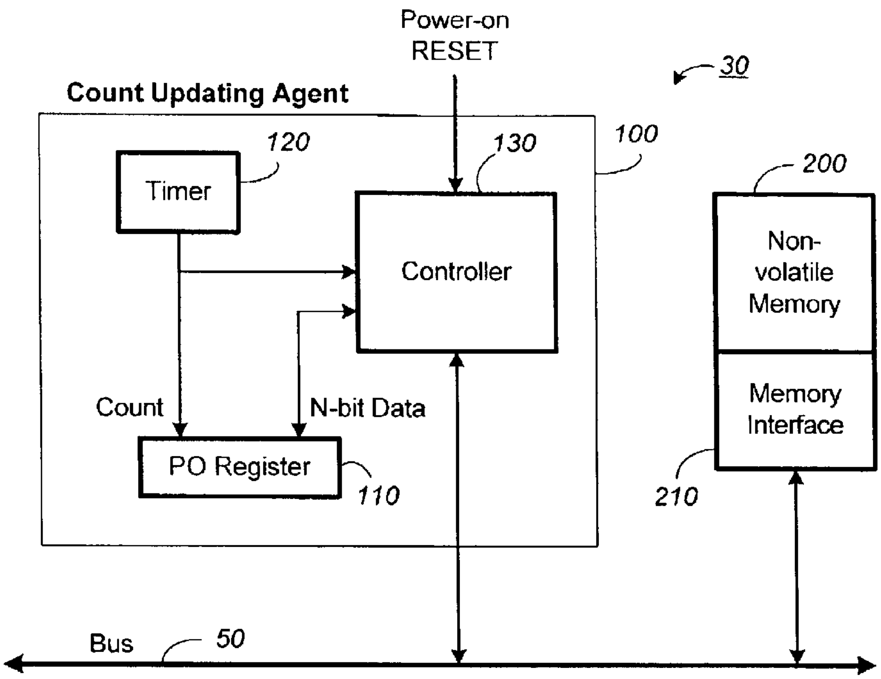
FIG. 2 is a schematic block diagram of a Power-on meter having a count updating agent operating with a non-volatile memory, according to one preferred embodiment of the invention.

FIG. 2 is a schematic block diagram of a power-on meter having a count updating agent operating with a non-volatile memory, according to one preferred embodiment of the invention. The power-on meter 30 has a count updating agent 100 operating with a non-volatile memory 200 via a bus 50. The non-volatile memory has a memory interface 210 that interfaces with the bus 50. As described in connection with FIG. 1A and FIG. 1B, the power-on meter 30 is configured to log the power-on periods or predefined events of a device such as the IC device chip 10. Generally, the power-on meter will also be powered from the same power supply 20 that powers the device 10.

The count updating agent 100 has a power-on register 110 that stores an N-bit data word. The value of the N-bit word represents the total number of counts or time intervals the power meter has logged since the device 10 was first put to use. Whenever the device is powered on, a timer 120 at predetermined times updates the count represented by the N-bit data word in the power-on register 110. As the power-on register will lose its memory when power is cut off, the N-bit data word in it is backed up into the non-volatile memory every time the count is incremented. Each updating event is also communicated to a controller 130. This signals the controller to backup the N-bit data word in the power-on register 110 by saving it to the non-volatile memory 200.

During periods when the device 10 is powered off, the power-on meter will also be off and there will be no increments to the power-on register 110. The accumulated count represented by the N-bit word will be preserved in the non-volatile memory 200.

Whenever the device is powered on, the power-on meter will resume logging the time or counts. In a preferred embodiment, the powering on of the device is communicated to the count updating agent 100 by a RESET signal. The controller 130 is responsive to the RESET signal to restore the N-bit data word from the non-volatile memory 200 to the power-on register 110. Thereafter, the count updating agent 100 will continue to update the N-bit data word count by count so long as the power remains on.

Figure 3:
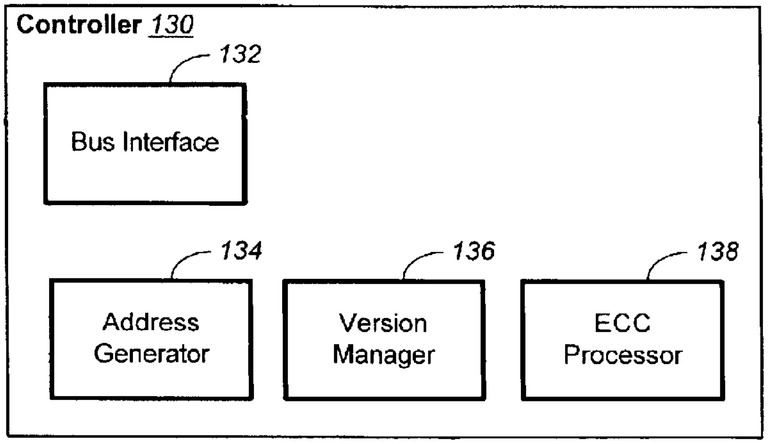
FIG. 3 is a schematic block diagram of the controller shown in FIG. 2.

FIG. 3 is a schematic block diagram of the controller shown in FIG. 2. In one preferred embodiment, the controller 130 includes a bus interface 132, an address generator 134, a version manager 136 and an ECC processor 138. The manner in which the controller backs up and restores the N-bit data word between the power-on register 110 and the non-volatile memory 200 will be described in more detail later. The controller 130 is implemented as a state machine.

Figure 4:
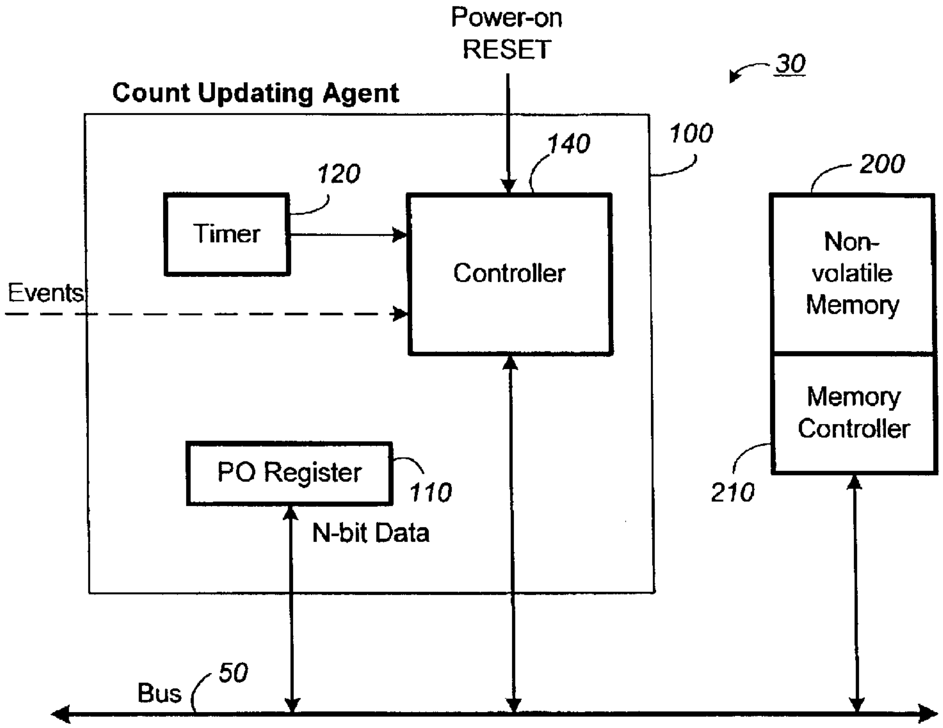
FIG. 4 is a schematic block diagram of a Power-on meter having a count updating agent operating with a non-volatile memory, according to another preferred embodiment of the invention.

FIG. 4 is a schematic block diagram of a Power-on meter having a count updating agent operating with a non-volatile memory, according to another preferred embodiment of the invention. The configuration is similar to that shown in FIG. 2 except the controller is implemented as controller 140, which is microprocessor-based. The controller 140 performs memory operations with the power-on register 110 and with the non-volatile memory 200 via the bus 50.

Figure 5:
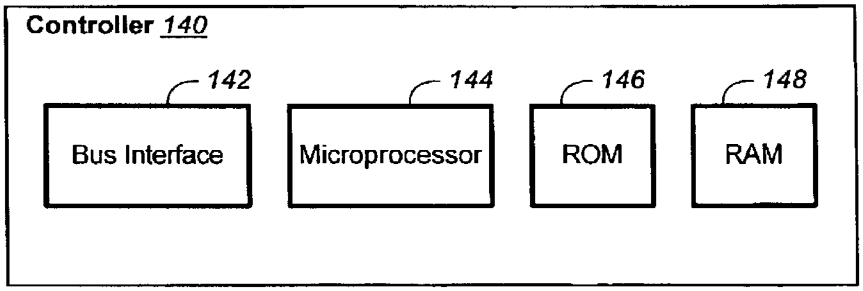
FIG. 5 is a schematic block diagram of the controller shown in FIG. 4.

FIG. 5 is a schematic block diagram of the controller 140 shown in FIG. 4. In one preferred embodiment, the controller 140 includes a bus interface 142, a microprocessor 134, a read-only memory ("ROM") 146 and a random-access memory ("RAM") 148. The various functional modules shown in the controller 130 of FIG. 3 can be implemented as firmware residing in the ROM 146. In one embodiment, the microprocessor 134 executes the firmware directly from the ROM 146. In another embodiment, the microprocessor 134 executes a copy of the firmware loaded into RAM 148 from the ROM 146.

Fail-Safe Data Backup

As described earlier in connection with FIGS. 1–5, when the device 10 is powered on, an N-bit data word in a power-on register 110 is incremented count by count to log the power-on time. In order to preserve the data in the expected event of a user powering down the device or in the unexpected event of power interruptions or surges, the N-bit word is backed up every time it has been altered (i.e., after each count) into the non-volatile memory 200. When the device is powered on again, the N-bit data word is restored to the power-on register from the non-volatile memory.

The process of writing data to the non-volatile memory takes a finite amount of time. For example, a flash EEPROM suitable for use may have a write time of 14 ms. It is possible that power interruptions or surges may occur in the middle of the writing process. In that event, the data saved in the non-volatile memory may become corrupted, causing the time durations or counts logged hitherto to be lost.

According to another aspect of the invention, a fail-safe memory backup scheme is implemented so that data is always preserved under any power interruption situations. Essentially, two versions of the N-bit data word are maintained in the non-volatile memory 200 by the version manger 136 (see FIG. 3.) and a scheme is implemented where at least one valid version of the N-bit data word always exists in the non-volatile memory.

Whenever each version of the data word is backed up to the non-volatile memory, an associated error correction code ("ECC") is computed and backed up along with the data word. In the preferred embodiment, the ECC is computed by the ECC processor 138 shown in FIG. 3. The ECC is used to check if the data word has been saved to the non-volatile memory without error. In the preferred embodiment, the ECC is a 7-bit checksum, although other codes such as a parity bit are also contemplated.

When restoring the N-bit data word to the power-on register 110, the two versions are checked for validity against their associated ECCs by the ECC processor 138. There are two possibilities: one is when both versions are valid and the other is when one version is valid and one version is corrupted. Generally, a valid version with the largest count is selected for restoration. In other words, if both versions are valid, the one that carries the higher count will be selected. If only one version is valid, it has the only usable count by default and will be selected. When it comes to backing up the N-bit data into the non-volatile memory, the data is used to replace the version that was not last selected. In this way, even if the back up proves unsuccessful it will not overwrite a valid version. Thus, there will always be a valid version of the N-bit data word preserved in the non-volatile memory 100.

Figure 6:
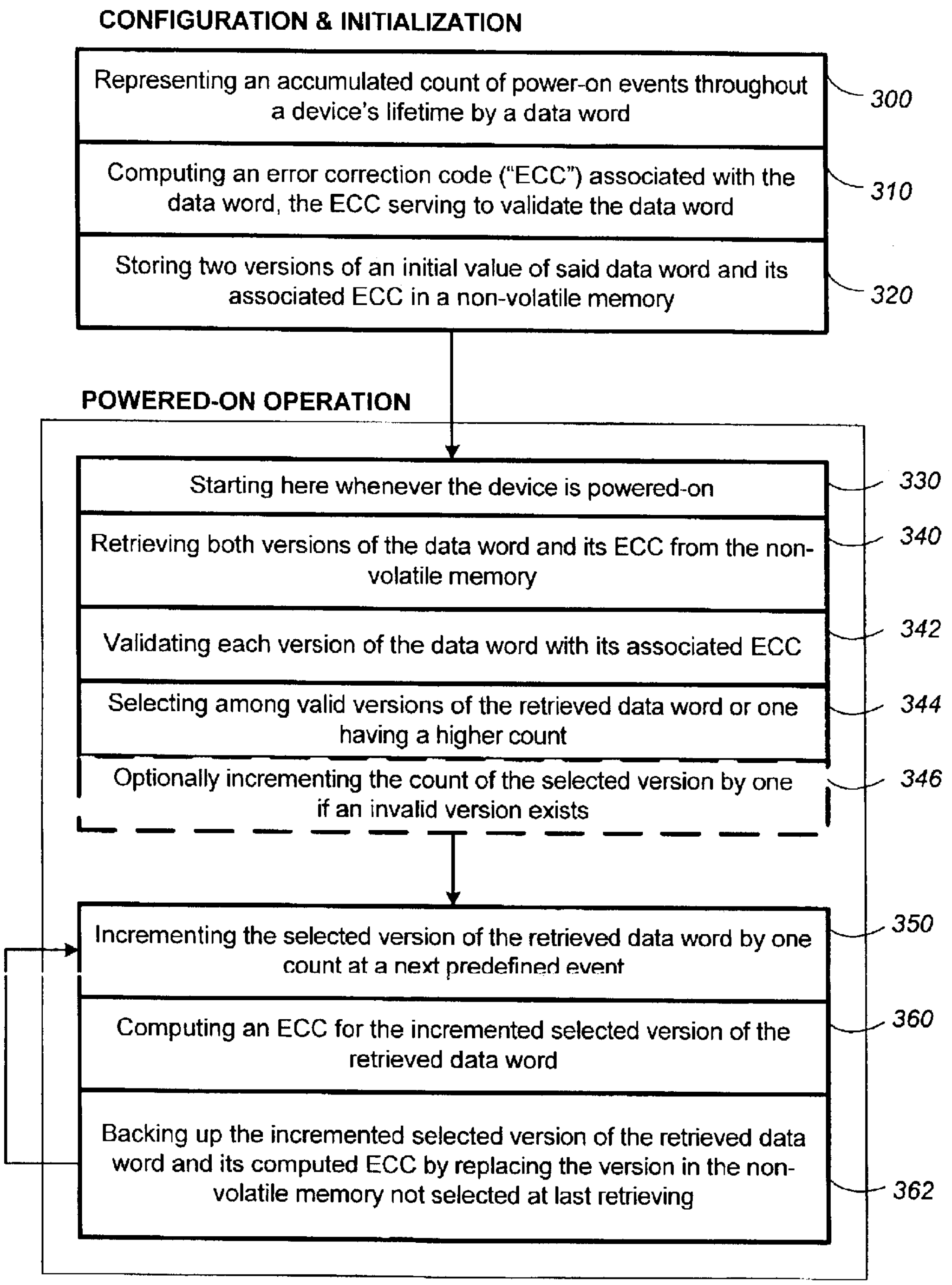
FIG. 6 is a flow chart illustrating a fail-safe method of preserving the N-bit data word by employing the redundant versions scheme of the present invention.

FIG. 6 is a flow chart illustrating a fail-safe method of preserving the N-bit data word by employing the redundant versions scheme of the present invention. The initial configuration and setup for the non-volatile memory 200 are given by Steps 300–320. Thereafter, the operations of the power-on meter are given by Steps 330–362.

Step 300: Representing an accumulated count of events throughout a device's powered-on history by a data word. In the preferred embodiment an N-bit data word is employed for representing $2^N-1$ time units or counts.

Step 310: Computing an error correction code ("ECC") associated with the data word, the ECC serving to validate the data word.

Step 320: Storing two versions of an initial value of said data word and its associated ECC in a non-volatile memory. In the preferred embodiment, the two versions are each chosen to be a data word representing a count of zero.

Step 330: Starting here whenever the device is powered on.

Step 340: Retrieving both versions of the data word and its ECC from the non-volatile memory.

Step 342: Validating each version of the data word with its associated ECC.

Step 344: Selecting among valid versions of the retrieved data word or one having a higher count.

Step 350: Incrementing the selected version of the retrieved data word by one count at a next predefined event.

Step 360: Computing an ECC for the incremented selected version of the retrieved data word.

Step 362: Backing up the incremented selected version of the retrieved data word and its computed ECC by replacing the version in the non-volatile memory not selected at last retrieving. Returning to Step 350 unless the power has been turned off.

In another embodiment where the count accuracy is considered important, Step 344 is augmented by an additional step:

Step 346: when one of the versions is invalid, the selected version is incremented with an additional count. This is because the invalid version must be the one last saved to memory and therefore is one count ahead of the other version. Since the other version is selected, it should be incremented by one count to properly reflect the current count. In this way, there is no accuracy lost during power fail events.

Data Structure and Configuration for a Limited Write Memory

According to another aspect of the invention, a robust power-on meter is implemented with a limited write memory by a partitioned memory configuration and operation with respect to the data word and its error correction code. As described earlier, non-volatile memories such as low cost flash EEPROM typically have an endurance of about 10000 writes per memory location. If the data word is backed up to the non-volatile memory after each count increment, the total count will be limited by the endurance limit of the given non-volatile memory. The present scheme allows a robust power-on meter to be implemented where the total number of counts far exceeds the endurance limit of the non-volatile memory.

Essentially, the data word used to represent a given range of counts is partitioned into a least significant ("LS") subword and a most significant ("MS") subword. The LS subword is such that a full cycling of all its bit combinations will not exceed the endurance limit of the non-volatile memory. In this way, a full cycle of counts as represented by the LS subword will be able to be stored in a same memory location count by count. The MS subword is such that a full cycling of all its bit combinations is able to be stored in a same memory location without exceeding the endurance limit of the non-volatile memory. In this way, a full cycle of most significant counts will not exceed the endurance limit of the non-volatile memory. The invention furthers calls for storing every new cycle of the LS subword in a different memory location. The different memory location has an address dependent on the value of the MS subword. In this way, every time a bit changes in the MS subword, the next cycling the of the LS subword is stored in a different location in the non-volatile memory. Thus, the non-volatile memory is able to store a range of counts whose maximum number far exceeds its endurance limit.

Figure 7:
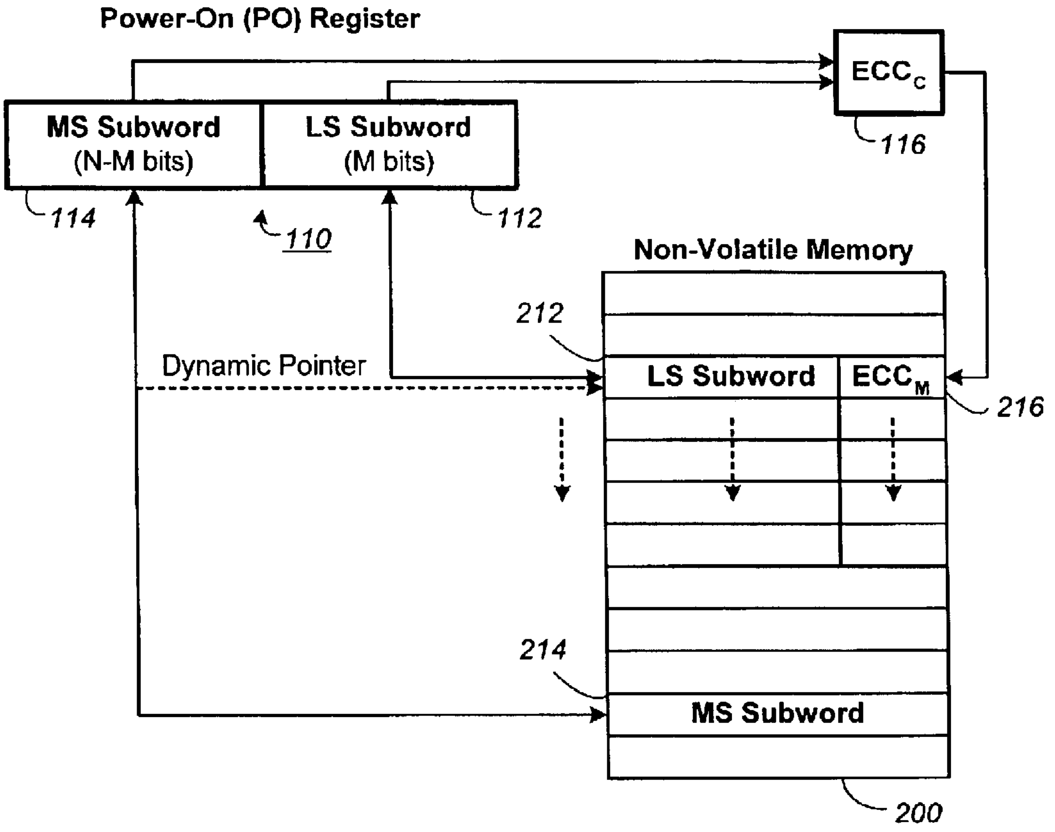
FIG. 7 illustrates schematically the memory organization between the Power-on register and the non-volatile memory.

FIG. 7 illustrates schematically the memory organization between the Power-on register 110 and the non-volatile memory 200. The power-on register 110 is able to store an N-bit data word where N is an integer whose value is determined by the total number of counts required. For example, if N=18, the N-bit data word can represent a range of 0–262,143 counts. If each count represents an hour, that will be up to a maximum of about 30 years.

The N-bit data word is loaded into the power-on register 110 and is incremented count-by-count during periods the device is powered on. To preserve the data in case of power interruptions, after each increment it is backed up into the non-volatile memory 200.

However, a low-cost non-volatile memory can only endure a small number of writes. If the memory specifies that it can reliably support at least W writes, then each memory location should not be written to more than W times. As an example, a low cost EEPROM may have W=10,000.

To address the endurance limit of the non-volatile memory 200, the N-bit data word is further partitioned into an M-bit least significant ("LS") subword, and a (N-M)-bit most significant ("MS") subword. When the N-bit data word is stored in the power-on register 110, the LS subword occupies a first portion 112 and the MS subword occupies a second portion 114 of the power-on register 110. The value M is determined by $2^M$<=W. In the example where maximum number of writes W is 10,000, then it is preferably to select M=13 for the LS subword. A full cycling of the combination of bits in the LS subword will run from 0 to 8191 counts and therefore can be backed up into the same non-volatile memory location after each count without exceeding the limit of 10,000 writes.

Each time the N-bit data word is incremented in the power-on register 110, the controller 130 or 140 backs up a copy of the LS subword into the non-volatile memory 200. The LS subword is backed up into the non-volatile memory 200 at a first location 212 whose address changes dynamically so that the endurance limit W is never exceeded. Within the same LS subword cycle, the LS subword will be stored in a same memory location 212.

Continuing with the same example, if N=18, then the MS subword will be 5 bits. The MS subword will only have its bit combination changed a maximum of 31 times. Each change occurs by a carrying over of the count from the LS subword after it has undergone a full cycle (e.g. from 0 to 8191 counts.) The MS subword will be backed up to a fixed, second location 214 in the non-volatile memory 200.

The MS subword is only backed up into the first location 214 whenever it changes, which is about once every full cycling of the LS subword. Thus, after each increment in the MS subword, the location of the LS subword in the non-volatile memory is moved to avoid writing in the same location beyond the endurance limit. In the preferred embodiment, the address generator 134 (see FIG. 3) is responsive to the change in the MS subword to generate a new memory address for the LS subword. The address of the new location is a function of the value of the MS subword. In a particular implementation, the MS subword is incorporated as a portion of the address for the LS subword. For the 5-bit MS subword example, the 5 bits of the MS subword would form a part of the address for the LS subword. This would guarantee that each time a bit in the MS subword changes, the next iteration of the LS subword would be stored in a different location from previously.

According to one aspect of the invention, an error-checking feature is incorporated to ensure the robustness of the N-bit data word. In one embodiment an error-correction code ("ECC") is computed from the N-bit data word from the power-on register 110 and is backed up together with the LS subword into the non-volatile memory 200. The controller 130 or 140 and in particular the ECC processor 138 computes an error-correction code, $ECC_R$ from the N-bit data word from the power-on register 110 just prior to the data being backed up to the non-volatile memory. The $ECC_R$ is placed in an ECC register 116 before being stored in the non-volatile memory as $ECC_M$ in a third memory location 216. As illustrated in FIG. 6, after each count, an instance of the updated N-bit word will be backed up in the non-volatile memory 200. There will be the dynamic first location 212 for storing the LS subword, the fixed, second location 214 for storing the MS subword, and a dynamic third location 216 corresponding to the first location 212 for storing the $ECC_M$.

At every power-on, the controller will restore the N-bit data word from the non-volatile memory 200 to the power-on register 110. The controller retrieves the LS subword from the first location 212, the MS subword from the second location 214 to form the N-bit data word. It also retrieves the associated $ECC_M$ from the third location 216. The controller then checks the validity of the retrieved N-bit data word by computing its ECC as $ECC_R$ and comparing it to the retrieved $ECC_M$. If the two ECCs match, the retrieved N-bit data word is valid and is restored to the power-on register 110. Otherwise, the LS subword or the MS subword or both have become corrupted.

In one embodiment, the ECC is simply a parity bit. In another embodiment, the ECC is a more sophisticated code that is capable of correcting one or more erroneous bits among the N-bit data.

Figure 8:
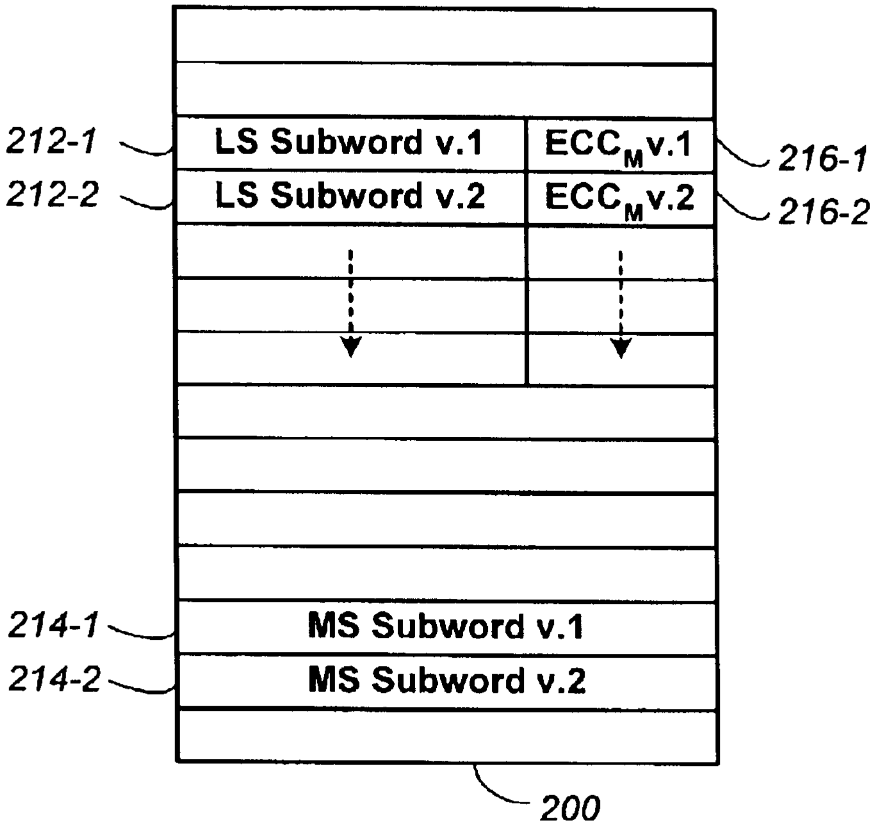
FIG. 8 illustrates the error checking and memory organization scheme of the Power-on meter, according to another aspect of the invention.

FIG. 8 illustrates the error checking and memory organization scheme of the Power-on meter, using the two-version redundancy scheme. Generally the memory organization is similar in structure to that shown in FIG. 6, except there will now be two versions of the N-bit data word. Thus, two versions, LS subword v.1 and LS subword v.2 are respectively stored in dynamic, first locations, 212-1 and 212-2. Two versions, MS subword v.1 and MS subword v.2 are respectively stored in fixed, second locations, 214-1 and 214-2. Two versions, $ECC_M$ v.1 and $ECC_M$ v.2 are respectively stored in corresponding dynamic third locations, 216-1 and 216-2.

Figure 9A:
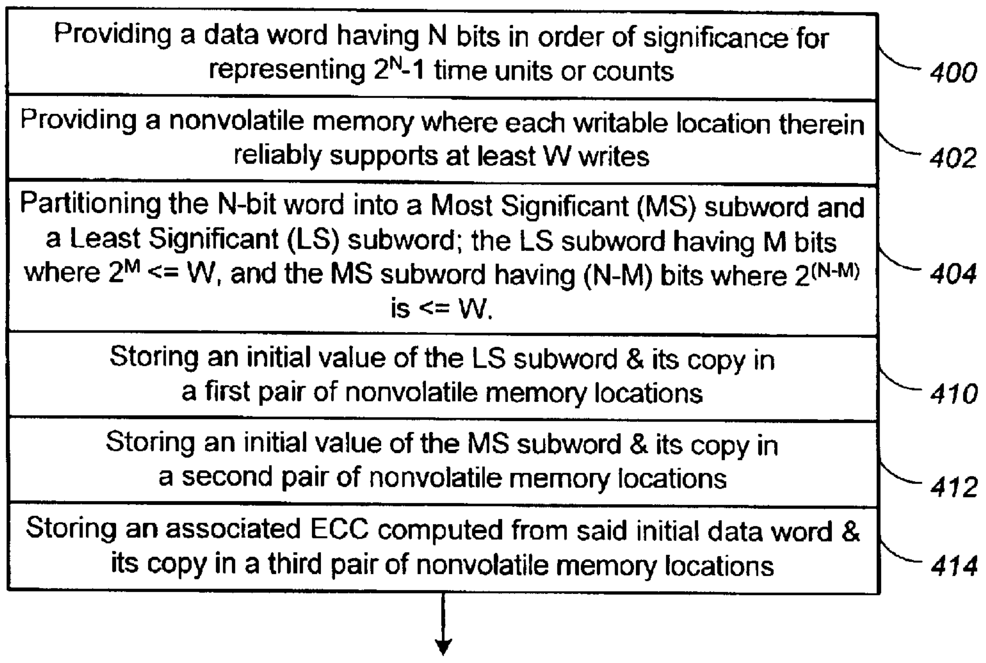
FIG. 9A and FIG. 9B together form a flow chart illustrating the operation of the Power-on meter, according to another aspect of the invention.
Figure 9B:
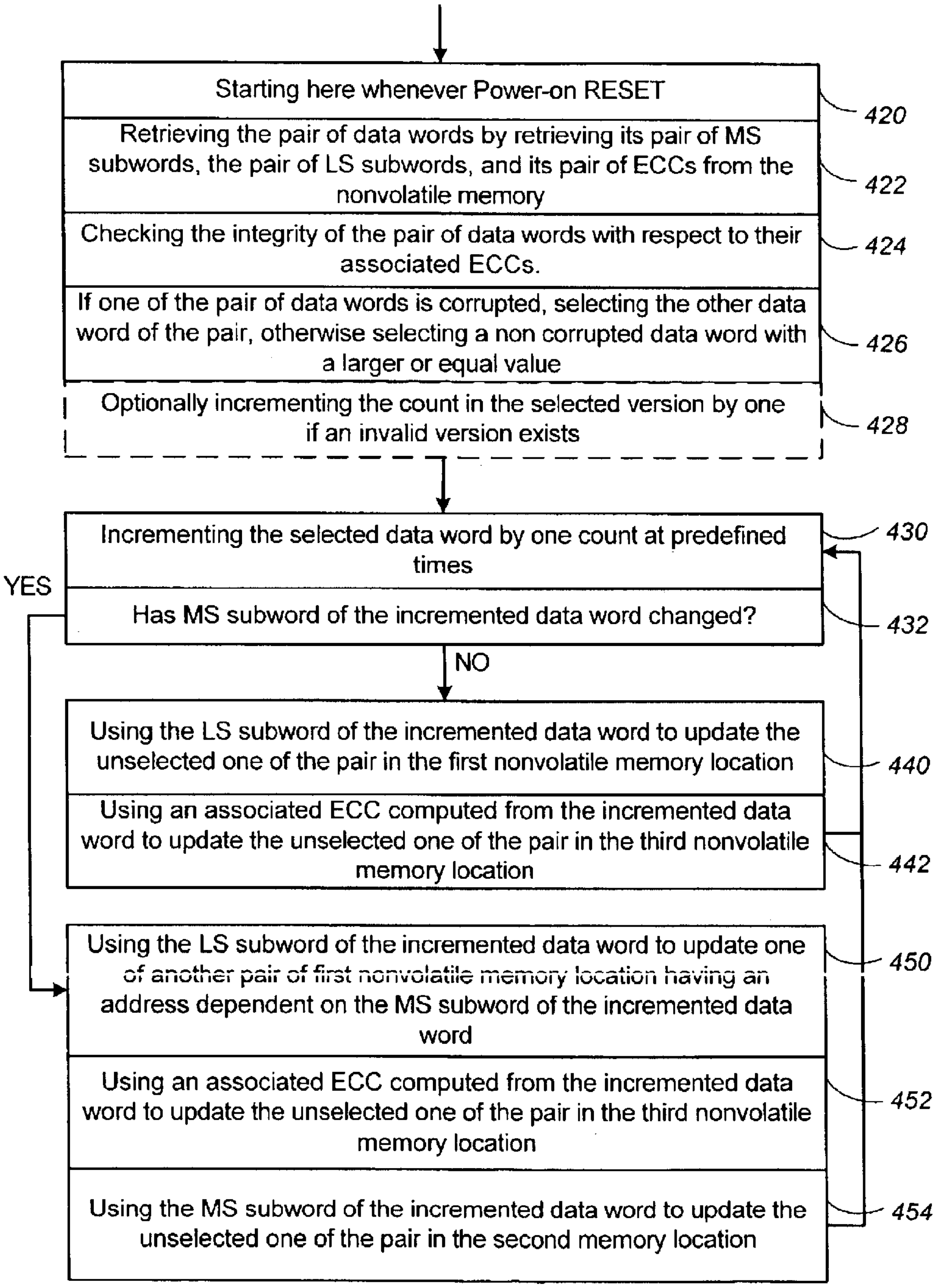

FIG. 9A and FIG. 9B together form a flow chart illustrating the operation of the Power-on meter 30, according to the two-version redundancy scheme. In particular, FIG. 9A illustrates the initial configuration and setup for the non-volatile memory 200 as given by Steps 400–414. FIG. 9B illustrates the operation of the power-on meter thereafter, as given by Steps 420–454.

Step 400: Designating an N-bit data word for representing $2^N-1$ time units or counts.

Step 402: Providing a non-volatile memory for backing up the N-bit word. The non-volatile memory has a specification that allows W reliable writes to each writable memory location.

Step 404: Partitioning the N-bit word into a Most Significant (MS) subword and a Least Significant (LS) subword; the LS subword having M bits where 2M <=W, and the MS subword having (N-M) bits where 2(N-M)<=W.

Step 410: Storing an initial value of the LS subword & its copy in a first pair of non-volatile memory locations.

Step 412: Storing an initial value of the MS subword & its copy in a second pair of non-volatile memory locations.

Step 414: Storing an associated ECC computed from said initial data word and its copy in a third pair of non-volatile memory locations.

Step 420: Starting here whenever Power-on RESET.

Step 422: Retrieving the pair of data words by retrieving its pair of MS subwords, the pair of LS subwords, and its pair of ECCs from the non-volatile memory.

Step 424: Checking the integrity of the pair of data words with respect to their associated ECCs.

Step 426: If one of the pair of data words is corrupted, selecting the other data word of the pair, otherwise selecting a non-corrupted data word with a larger value.

Step 430: Incrementing the selected data word by one count at predefined times.

Step 432: Has the MS subword of the incremented data word changed? If it has, proceeding to Step 450, otherwise to Step 440.

Step 440: Using the LS subword of the incremented data word to update the unselected one of the pair in the first non-volatile memory location.

Step 442: Using an associated ECC computed from the incremented data word to update the unselected one of the pair in the third non-volatile memory location. Returning to Step 430 unless the power has been turned off.

Step 450: Using the LS subword of the incremented data word to update one of another pair of first non-volatile memory location having an address dependent on the MS subword of the incremented data word.

Step 452: Using an associated ECC computed from the incremented data word to update the unselected one of the pair in the third non-volatile memory location.

Step 454: Using the MS subword of the incremented data word to update the unselected one of the pair in the second memory location. Returning to Step 430 unless the power has been turned off.

In another embodiment where the count accuracy is considered important, Step 426 is augmented by an additional step:

Step 428: when one of the versions is invalid, the selected version is incremented with an additional count. This is because the invalid version must be the one last saved to memory and therefore is one count ahead of the other version. Since the other version is selected, it should be incremented by one count to properly reflect the current count.

Although the various aspects of the present invention have been described with respect to certain embodiments, it is understood that the invention is entitled to protection within the full scope of the appended claims.

It is claimed:

1. A power-on meter for a device, comprising:

a data word having multiple bits in order of significance representing a count of events;

a non-volatile memory for storing said data word and an associated error correction code ("ECC"), said non-volatile memory having a predetermined maximum permissible number of writes to each of its addressable locations;

said data word being partitioned into at least a first subword having a group of less significant bits and a second subword having a remaining group of more significant bits, wherein said first and second subwords have permutations not exceeding the predetermined maximum permissible number of writes of said non-volatile memory and each subword is independently writable to and readable from said non-volatile memory;

a count updating agent responsive to whenever said device is powered on for reading said data word from said non-volatile memory;

said count updating agent incrementing said read data word by one count at predetermined events while said device is powered on; and whenever said read data word is incremented with a change in its first subword but not in its second subword, said count updating agent updating the first subword and the associated ECC in the non-volatile memory at their existing location; and whenever said data word is incremented with a change in both its first and second subwords, said count updating agent updating the second subword in the non-volatile memory at its existing location and also storing the changed first subword and the associated ECC in a location different from their existing ones in the non-volatile memory, the different location having an address dependent on the second subword.

2. A power-on meter for a device as in claim 1, wherein said count updating agent further comprises:

a register for temporarily storing said data word read from said non-volatile memory while said device is powered on.

3. A power-on meter for a device as in claim 1, wherein said count updating agent further comprises:

a controller for restoring said data word from said non-volatile memory to said register whenever said device is just powered on.

4. A power-on meter for a device as in claim 1, wherein said count updating agent further comprises:

a controller for updating the incremented data word from said register to said non-volatile memory.

5. A power-on meter for a device as in claim 1, wherein said count updating agent further comprises:

a timer for generating timings for said predetermined events.

6. A power-on meter for a device as in claim 1, wherein said non-volatile memory includes electrically erasable programmable read-only memory ("EEPROM").

7. A power-on meter for a device as in claim 1, wherein said non-volatile memory includes flash electrically erasable programmable read-only memory ("flash EEPROM").

8. A power-on meter for a device as in claim 1, wherein said controller is a state machine.

9. A power-on meter for a device as in claim 1, wherein said controller is a microprocessor.

10. A power-on meter for a device as any one of claims 1–7, wherein the count events is a cumulative count of power-on time periods for the device.

11. A power-on meter for a device as any one of claims 1–7, wherein the count events is equivalent to a cumulative measure of device usage.

12. A power-on meter for a device as any one of claims 1–7, wherein said ECC is a check sum bit.

13. A method of counting power-on duration of a device, comprising:

providing a data word a data word having multiple bits in order of significance representing a count of events;

computing an error correction code ("ECC") associated with said data word, said ECC serving to validate said data word;

providing a non-volatile memory for storing said data word;

partitioning said data word into a first subword having a group of more significant bits and a second subword having a remaining group of less significant bits, wherein each subword is independently writable to said non-volatile memory and represents a number of permutations not exceeding a predetermined maximum permissible number of writes to said non-volatile memory;

reading said data word from said non-volatile memory whenever said device is just powered on;

incrementing said data word by one time unit at predetermined times while said device is powered on; and when the incremented data word does not result in a change in any of its more significant bits, only updating the second subword in its existing location in the non-volatile memory; and when the incremented data word results in a change in any of its more significant bits, updating the first subword in its existing location in the non-volatile memory and also updating the second subword in a different location from its existing location in the non-volatile memory, the different location having an address dependent on the first subword.

* * * * *